UNITED STATES PATENT OFFICE.

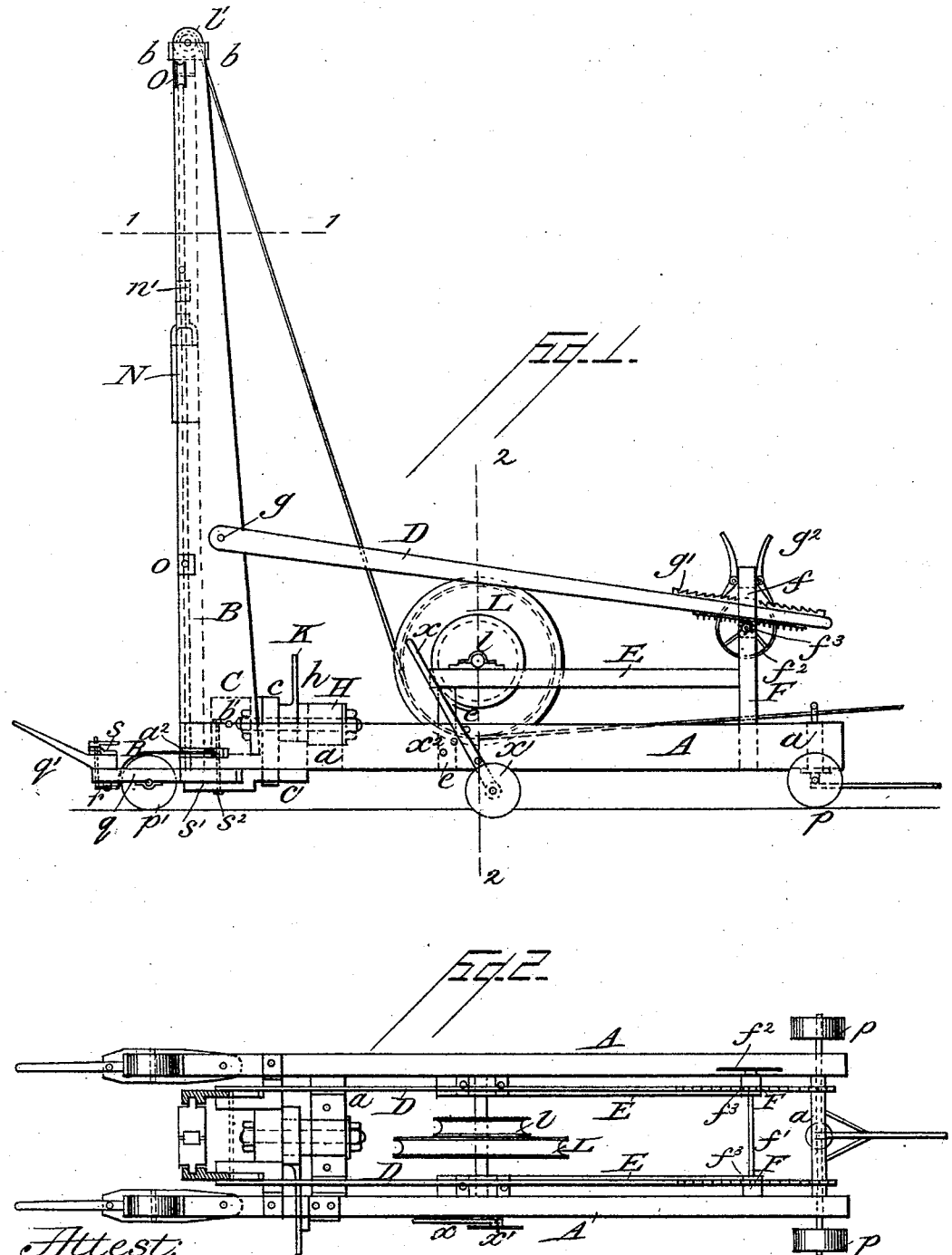

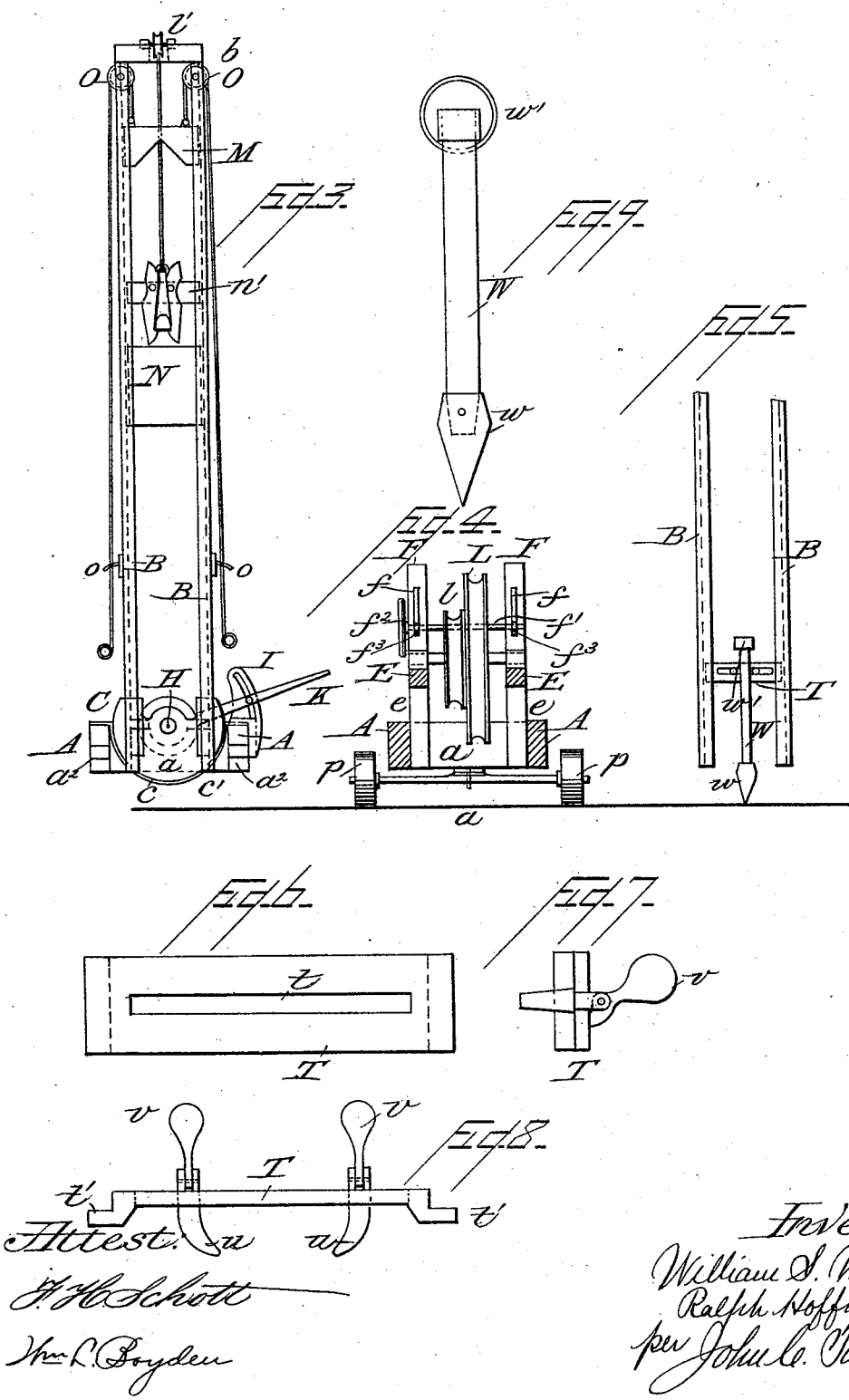

WILLIAM SCOTT MORDEN AND RALPH HOFFMAN, OF MONTAGUE, MICHIGAN, ASSIGNORS OF ONE-HALF TO GEORGE E. DOWLING, OF SAME PLACE.

MACHINE FOR DRIVING FENCE-POSTS.

SPECIFICATION forming part of Letters Patent No. 437,500, dated September 30, 1890.

Application filed April 4, 1890. Serial No. 346,638. (No model.)

*To all whom it may concern:*

Be it known that we, WILLIAM SCOTT MORDEN and RALPH HOFFMAN, citizens of the United States, residing at Montague, in the county of Muskegon and State of Michigan, have invented certain new and useful Improvements in Machines for Driving Fence-Posts; and we do hereby declare the following to be a full, clear, and exact description of the invention, such as will enable others skilled in the art to which it appertains to make and use the same.

Our invention relates to improvements in machines for driving fence-posts, the object being to provide a convenient and efficient machine for this purpose which may be substituted as a power device for the hand devices now commonly employed, our improved machine being arranged so as to be easily locomotive from place to place, and preferably propelled by horse-power, another object of the invention being to replace boring-machinery which employs an auger or other boring device by a driving mechanism, it being considered that better results can be produced by the forcible insertion of a post into the ground under the action of driving mechanism than by the insertion of the post into a hole produced by means of a boring-tool; and the invention consists, essentially, in the combination of a horizontal frame arranged to be locomotive and a vertical or upright frame which carries the hammer, said vertical frame being capable of lateral adjustment toward any point of the compass; and, further, the invention consists in certain details in the construction, arrangement, and combination of parts, substantially as will be hereinafter described and claimed.

In the annexed drawings, illustrating our invention, Figure 1 is a side elevation of our improved machine for driving fence-posts. Fig. 2 is a plan view of the same, in partial section, on the line 1 1 of Fig. 1. Fig. 3 is a detail end elevation of the upright frame, shown as detached from the other parts of the machine. Fig. 4 is a cross-sectional elevation on the line 2 2 of Fig. 1. Fig. 5 is a detail elevation of a portion of the upright frame, and shows the guide for holding the post-pin, with said pin in position in the guide. Figs. 6, 7, and 8 are enlarged detail views of the guide device which holds the post-pin or the post while being operated upon by the hammer. Fig. 9 is an enlarged view of the pin which we employ at certain times for making a hole in the ground into which to insert the end of the post for the purpose of more easily and securely driving the latter into position.

Like letters of reference designate corresponding parts throughout all the different figures of the drawings.

A denotes the two sides of the horizontal frame of the machine, said sides being beams or timbers of convenient length, which are connected together by the cross-bars $a\ a$, of which cross-bars there may be any number. Two sides A A of this horizontal frame are provided near their rear ends with horizontal slots $a^2$. This horizontal frame may therefore be of any suitable and convenient size. It constitutes the main frame and is in reality a sort of carriage that supports and conveys the mechanical devices which make up the machine. It is provided with suitable trucks or wheels to render it easily locomotive. At the front end is a movable axle carrying two wheels $p\ p$. There is also an ordinary wagon-tongue and other accompanying parts, the same as in common use.

$p'\ p'$ denote the rear wheels, which are carried by the frames $q\ q$. The arrangement of these wheels, their brakes, and the other adjacent parts, will be hereinafter more fully described.

At the rear end of the horizontal frame is mounted the laterally-adjustable upright frame, said frame being so arranged that it can be moved either backward or forward in the direction of the length of the horizontal frame, or can be moved to one side or the other in a direction at right angles to the general direction of the horizontal frame. In other words, it may be said that this upright frame is laterally adjustable in four directions so that it may be always fixed in an upright position whatever may be the unevenness of the ground which supports the horizontal frame, and therefore when said horizontal frame is not level, but is irregularly situated, owing to the unevenness of the ground in any particular locality, the upright frame may be adjusted so as to be in a vertical position to permit the hammer to reciprocate in a vertical line and thus deliver its blows squarely upon the head of the post and drive the latter in a true vertical position. This upright frame consists of the two sides B B, which are connected together at the top by means of the cross-bars $b\ b$. The inner opposing faces of these sides B B are provided from top to bottom with suitable grooves, which receive tongues on the sides of the hammer N, and in the grooves consequently the hammer slides up and down. The upright frame is pivoted near its bottom end by means of the horizontal bolt $b'$, which passes through the horizontal casting C and also through the sides B B of the upright frame. (See Figs. 1 and 2.) On this bolt the upright frame is capable of oscillating backward or forward in the general direction of the length of the horizontal frame. This adjustment of the upright frame is accomplished by means of the rods or links D D, situated approximately in a horizontal position and pivoted at $g\ g$ to the sides B B at suitable distances above the lower ends of said sides B B.

E E designate two side bars located horizontally and supported at one end upon the uprights $e\ e$, mounted on the horizontal frame A. The bars E E at their other ends are connected to the vertical posts F F, which are likewise securely fastened upon the horizontal frame. The posts F F (see Fig. 4) are provided near their upper ends with elongated vertical slots $f\ f$, through which pass the free ends of the rods or links D D. A horizontal shaft $f'$ is journaled in both posts F. Said shaft carries two rack-pinions $f^3$, which are located, respectively, below each rod D. Furthermore, the shaft $f'$ is provided with a hand-wheel $f^2$, by means of which it is manipulated. The pinions $f^3 f^3$ engage rack-bars on the under side of each of the rods D D, the upper sides or edges of said rods being provided with ratchet-bars $g'$. (See Fig. 1.) Said ratchet-bars throughout half their length have their teeth inclined in one direction and inclined in another direction throughout the other half. Pivoted to the upper end of each of the posts F are two ratchet-levers or pawls arranged to engage the ratchet-bars, one of the said pawls adapted to engage the section of the ratchet-bar having teeth of one inclination, while the other pawl engages the teeth of the ratchet-bar having the other inclination. One of the pawls may therefore be employed while the other is idle. Thus it will be seen that by the revolution of the hand-wheel the rods D D may be moved endwise, and thus the upright frame adjusted backward or forward to any desired degree of inclination, in which position it will be securely held by the proper engagement of the pawls with the ratchet-bars, with which (we have seen) the rods D D are provided.

We return now to the casting C. This, it will be observed, by referring to Fig. 2, is flat and smooth on the sides next to the upright frame, so that the sides B B of said frame may lie closely and neatly against the sides of the casting, where said sides are supported by the pivotal pins $b'$, which runs through said casting. This casting C is furthermore constructed with a curved or semicircular lip or bearing $c$, (see Fig. 3,) which rests and works upon a curved iron or other metallic strap $c'$, which is fastened at each end to the sides A A of the main horizontal frame, and this strap therefore, it will be seen, assists in carrying the weight of the upright frame. The object of this construction of the circular or curved bearing upon the curved strap is to permit the upright frame to be moved laterally to one side or the other in a plane at right angles to the plane of its adjustment when operated upon by the links D D. Upon the cross-bar $a$ of the main horizontal frame, which cross-bar is located close to the casting C, is securely fastened a casting H, (see Figs. 2 and 3,) said casting being securely fastened to the cross-bar by $h\ h$. A horizontal stud-bolt, having a collar $h'$, is carried by the aforesaid casting H, it being secured thereto by means of a nut, as shown, while the other end of the said stud passes through and supports the casting C, keeping the same in position by means of a nut located on this end of the stud, but the parts being so connected that perfect freedom of movement is permitted to the casting C, allowing it to be freely movable or oscillatory between the nut and the collar $h'$, so that the curved bearing of the casting C may play easily upon the curved strap $c'$, for the purpose of accomplishing the lateral adjustments of the upright frame, as hereinbefore specified. To one side of the horizontal frame is secured a bracket I, having a slot therein of suitable length. (See Fig. 3.)

K is a lever, the hub of which is attached to the casting C, said lever being provided with a bolt which passes through a slot in the bracket I. It will therefore be seen that in the adjustment of the upright frame the lever-handle K may be made use of for the purpose of moving the casting C upon its curved bearings and thus accomplishing the adjustment.

L and $l$ designate two rope pulleys or sheaves carried by a horizontal shaft, which is journaled in suitable boxes fastened upon the upper sides of the bars E E, which we have before noticed are supported by the posts $e\ e$ and posts F F, mounted on the horizontal frame. In the upper end of the upright frame is a small sheave $l'$.

M indicates a movable block, which is V-shaped on the under side. (See Fig. 3.) It slides in the same grooves as the hammer N.

This hammer N has considerable weight. On its upper side is a projection or tongue adapted to be engaged by the notched arms $m$ $m$, which are pivoted to the face of the cross-bar $n'$, which also travels in the grooves in the sides B B of the upright frame, said cross-bars $n'$ being provided with an eye, loop, or staple, to which one end of a rope is connected, which rope is arranged for the purpose of operating the hammer N, and which passes over the eye on cross-bar $n'$, through the center of the upper block M, over the pulley-sheave $l'$, once around the lower pulley L, through an eye fastened to the forward cross-bar of the main horizontal frame, and thence to the horse that operates the machine, or to such other motive power as may be used. To gain power, if desired, this hammer-operating rope may be attached to the smaller pulley $l$, while the rope running from the horse may be connected to the larger one, as preferred.

In the sides B B of the upright frame, near their upper ends, are two small sheaves O O, similar to the rope-sheave $l'$, said sheaves O O being suitably pivoted. A rope passes from each one of them and is attached at one end to each side of the movable block M. These ropes are provided each with a series of loops adapted to engage the hooks or pins $o$ $o$, projecting from the sides B B at suitable points thereon. By means of these ropes the block M can be raised or lowered and thus adjusted to any desired height, so as to permit the hammer to have any desired length of drop to suit the different requirements of the position in which the machine may at any one time be operating.

We have already said that the rear wheels $p'$ are pivoted in frames $q$ $q$. To these frames $q$ $q$ handles $q'$ $q'$ are connected. (See Figs. 1 and 2.)

R designates a brake-strap, there being one of them for each wheel $p'$. The upper end of this brake-strap is fastened to a casting, which is located within the slot $a^2$ in the side beam A and is free to play sidewise therein. The other end of the strap is fastened to the lever $r$, (see Fig. 1,) which is pivoted below the frame $q$ at a point near its own center. A vertical bolt engages with the other end of the lever $r$, which bolt passes up through the frame $q$ and its handle $q'$, and is provided at the top with a screw. A lever-nut formed with a recess is used for the purpose of tightening these brakes, and the fork $s$ enters this recess, and, being fastened to the handle, the nut merely revolves around, while the bolt is thus operated upon and raised or lowered perpendicularly.

$s'$ indicates a plate fastened to the under side of the beams A A. Through this beam and the piece $s'$ passes a vertical bolt $s^2$, and on this bolt the wheel-frame $q$ and its brake device $r$ easily rotate. By means of this construction, therefore, it will be seen that the rear wheels may readily, with ease and speed, be set with the brakes applied, thus kept from rotating, and adjusted so as to occupy any adjusted position to accommodate the unevenness of the ground and to properly arrange the rear of the locomotive-frame when the machine has been located at any desired locality for the purpose of operating it.

T is the guide used for the purpose of holding the post-pin in place while the hammer is operating upon it. Figs. 5, 6, 7, and 8 show the construction of this part of the machine in detail and with clearness. The guide T is provided with a slot $t$ and with the side lips $t'$ $t'$, said side lips entering and sliding loosely and freely within the hammer-grooves of the upright frame.

U U designate curved arms that are adapted to engage with the post or with the post-pin, said arms being located within the slot in the guide T. These curved arms are provided with the pivoted weights V. These curved arms have shoulders, as shown in Fig. 7, so that by reason of the weights the shoulders may be kept tightly against the face, the weight and arm being pivoted together. Fig. 7 indicates the position of the weight when it is acting to hold the post. By raising the weight the device is loosened and may be moved out or in to receive a post of any desired size.

In Fig. 9, W is the post-pin having its body considerably smaller than its iron point $w$, which is preferably tapered in both directions, as shown—that is, toward its point and toward its upper end—said iron point $w$ being connected by a pin or other device to the main portion of the post-pin, the double taper being for the purpose of permitting the pin to be easily drawn out of the ground, which withdrawal is accomplished by means of the ring $w'$, connected to the upper end of the post-pin. On the side of the horizontal frame is a lever $x$, carrying at its lower end a disk, said lever being pivoted at $x'$ to the side A. In Fig. 1 this is shown with the disk entering the ground more or less. A series of holes are provided in the side of the frame, and accordingly as the ground is hard or soft the disk is lifted higher or lower and stopped in position by means of the pin $x^2$.

In operating the machine the hammer N will be lifted so as to be above the post-pin. It may be here stated that as posts of different diameters are used in making fences, a sufficient number of post-pins will be required to accommodate them, the iron point of the pin being in each case preferably about one inch smaller than the post. After the hammer has been lifted above the pin the post-pin will then be placed vertically and held in position by means of the curved arms U U we have already described. Then the block M will be raised to the proper height, said height being determined by the nature of the ground and the force of the blow of the hammer that may be required to drive the post in place. The brake will now be applied to both the rear wheels, so as to keep the machine perfectly stationary while the horse is harnessed to the rope. The arms $m\ m$ will now be in engagement with the tongue or projection on the weight N. If, now, the horse draws upon the rope, which is connected to the cross-piece $n'$, the weight will be lifted until the upper ends of the levers $m\ m$ strike against the V-shaped block M, the result of which will be to disconnect the arms $m\ m$ from the hammer, thus permitting the latter to drop and strike forcibly the head of the post-pin. One or two blows will be sufficient to insert the post-pin in to the proper depth, after which it can be withdrawn and the post, about one inch larger in diameter, or so, placed into the hole already made. The post will then be secured by the arms U and driven firmly down by means of the hammer N. In ground that is not too hard, the post may probably be successfully driven without the use of the iron post-pin. Fences are of course usually driven in a straight line. Our improved machine, in order to facilitate this arranging of the fence in a straight line, is constructed so that it can be guided from the rear ends by means of the two movable wheels $p'\ p'$. One man can operate both wheels in view of the mechanical constructions with which said wheels are provided, as we have already described, and thus guide the machine into its proper place for the next post.

Having thus described our invention, what we claim as new, and desire to secure by Letters Patent, is—

1. In a machine for driving fence-posts, the combination of the horizontal frame, the upright frame pivoted at its lower end to a casting supported by the horizontal frame, said casting having a curved face resting on the curved support, whereby the upright frame is sidewise adjustable and the links connected to the said upright frame, together with the means for reciprocating said links for the purpose of adjusting the upright frame backward or forward, substantially as described.

2. In a machine for driving fence-posts, the combination of the horizontal frame provided with wheels at the forward end, and at the latter end with wheels having brakes and carried by pivoted frames connected to the horizontal frame, the upright frame pivoted to a casting supported on the horizontal frame, said casting having a curved face working on a curved support, whereby the upright frame is laterally adjusted, the links pivoted to the upright frame and having ratchet and rack bars thereon, the operating-shaft with its pinions engaging said rack-bars, whereby the links are reciprocated, and the vertically-moving hammer, all arranged substantially as described.

3. In a machine for driving fence-posts, the combination of the horizontal frame, with its forward and rear wheels, said rear wheels being carried by pivoted arms on the main frame, which arms have suitable handles, the upright frame with its hammer, the V-shaped block movable in said frame above the hammer, the gripping devices for engaging the hammer, and the rope for operating it, substantially as described.

4. The combination of the horizontal frame, the upright frame supported thereon by a joint consisting of a pivot whereby the upright frame moves backward and forward, and a curved face working on a curved support, whereby the upright frame moves sidewise, the lever for imparting to the upright frame its sidewise movement, the pivoted links and their operating devices whereby the backward or forward adjustment is imparted to the upright frame, substantially as described.

5. The combination, with the upright frame consisting of two sides connected by suitable means, the inner opposing faces of said sides being grooved, of the hammer movable in said grooves, the cross-piece above the hammer likewise movable in grooves and carrying pivoted arms that engage the hammer, the rope connected to said cross-piece, whereby the hammer is lifted, and the V-shaped movable block, likewise traveling in the hammer-grooves above the hammer, substantially as described.

6. The combination of the upright frame consisting of the grooved side pieces, the hammer traveling in the said grooves, the cross-bar likewise traveling in the grooves above the hammer and carrying pivoted arms that engage the hammer, the rope connected to said cross-bar and running over a sheave in the top of the frame, and the adjustable V-shaped block held likewise within the hammer-grooves and adjusted to the proper position by means of ropes connected to each end thereof and running over pulley-sheaves, substantially as described.

7. The combination of the horizontal frame, the upright frame adjustable in four directions, the hammer carried by said frame, the clutching device for engaging the hammer, together with a rope, whereby the hammer is lifted, the V-shaped movable block above the hammer, whereby the clutching device is disengaged from the latter, the pulleys carried by the horizontal shaft supported on the main frame, all as specified.

8. The combination, with the upright frame pivoted at its lower end to the horizontal casting, said casting having a curved face operating on a curved support, of the lever secured to said casting for adjusting the curved face of the casting so that the upright frame may be properly positioned sidewise and the links pivoted to the sides of the frame and provided on their upper faces with ratchet-bars and on their lower faces with rack-bars, the pawls engaging the ratchet-bars, the horizontal shaft with its pinions engaging the rack-bars, and a manipulating-wheel, all arranged whereby the upright frame may be adjusted backward or forward, as specified.

9. The combination, with the upright frame, of the post-guide consisting of a slotted plate having lips engaging the grooves in the frame and the curved arms with their pivoted weights, whereby the post is firmly held.

10. In a machine for driving fence-posts, the combination, with the driving devices, of the post W, having the doubly-inclined end $w$ and the ring $w'$, substantially as described.

11. The combination of the horizontal frame having sides A A, the upright frame having sides B B, the casting C in the horizontal frame, the pivot-pin $b'$, whereby the lower ends of sides B B are pivoted to the casting C, said casting C having a curved flange $c$, supported by a curved strap $c'$, the casting H, supported on the cross-piece between the sides A A, and the stud which connects the castings C and H and permits the casting C to oscillate thereupon in the accomplishment of the sidewise adjustments, substantially as described.

12. The combination, with the upright frame consisting of the sides B B, pivoted at their base and connected at their upper ends by suitable cross-pieces, of the rods D D, pivoted to said sides, having on their upper edges ratchet-bars, which have throughout half their length teeth inclined in one direction and throughout the other half teeth inclined in an opposite direction and having on their lower edges rack-bars, the two pawls engaging the different teeth and the shaft with its pinions engaging the rack-bars, whereby the links are reciprocated and the upright frame adjusted, substantially as described.

In testimony whereof we affix our signatures in presence of two witnesses.

WILLIAM SCOTT MORDEN.
RALPH HOFFMAN.

Witnesses:
C. L. STRENG,
J. BISHOP.